(12) United States Patent
Jeon et al.

(10) Patent No.: US 7,332,235 B2
(45) Date of Patent: Feb. 19, 2008

(54) FUEL CELL SYSTEM

(75) Inventors: Ui-Sik Jeon, Seoul (KR); Young-Min Choi, Kyunggi-do (KR); Sang-Yeoul Ahn, Seoul (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 436 days.

(21) Appl. No.: 11/024,413

(22) Filed: Dec. 30, 2004

(65) Prior Publication Data

US 2006/0051649 A1     Mar. 9, 2006

(30) Foreign Application Priority Data

Sep. 7, 2004     (KR) .................. 10-2004-0071362

(51) Int. Cl.
 *H01M 8/00* (2006.01)
 *H01M 8/04* (2006.01)
(52) U.S. Cl. ..................... 429/12; 429/22; 429/23
(58) Field of Classification Search ............ 429/22, 429/23, 12
 See application file for complete search history.

(56) References Cited

FOREIGN PATENT DOCUMENTS

| JP | 7-302609 | * 11/1999 |
| KR | 10-2003-78973 | 10/2003 |
| KR | 78973 | 10/2003 |
| KR | 20-213572 | 12/2004 |
| KR | 213572 | 12/2004 |

OTHER PUBLICATIONS

English Language Abstract of Korea 2003-78973.
English Language Abstract of Korea 20-213572.

* cited by examiner

*Primary Examiner*—Patrick Joseph Ryan
*Assistant Examiner*—Thomas H. Parsons
(74) *Attorney, Agent, or Firm*—Greenblum & Bernstein, P.L.C.

(57) ABSTRACT

A fuel cell system includes a fuel cell stack generating an electric energy from an electrochemical reaction between hydrogen and oxygen, an air supply pump pumping air to the fuel cell stack, an adsorptive air filter filtering air sucked into the air supply pump; and an oxygen supply device connected to an air supply line between the fuel cell stack and the air supply pump, separating oxygen from the air and then supplying the oxygen.

9 Claims, 2 Drawing Sheets

[FIG. 1]  PRIOR ART
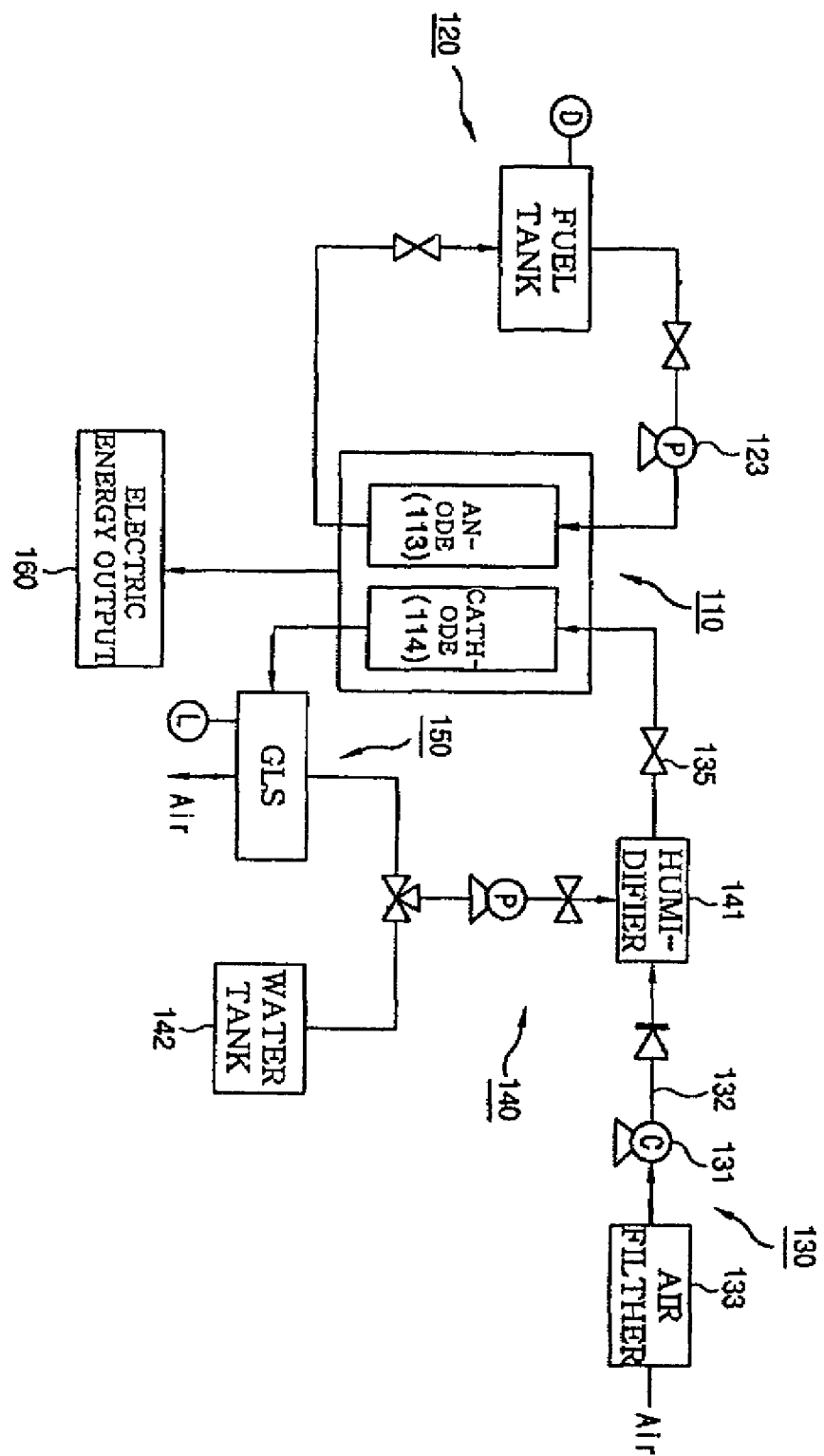

[FIG. 2]
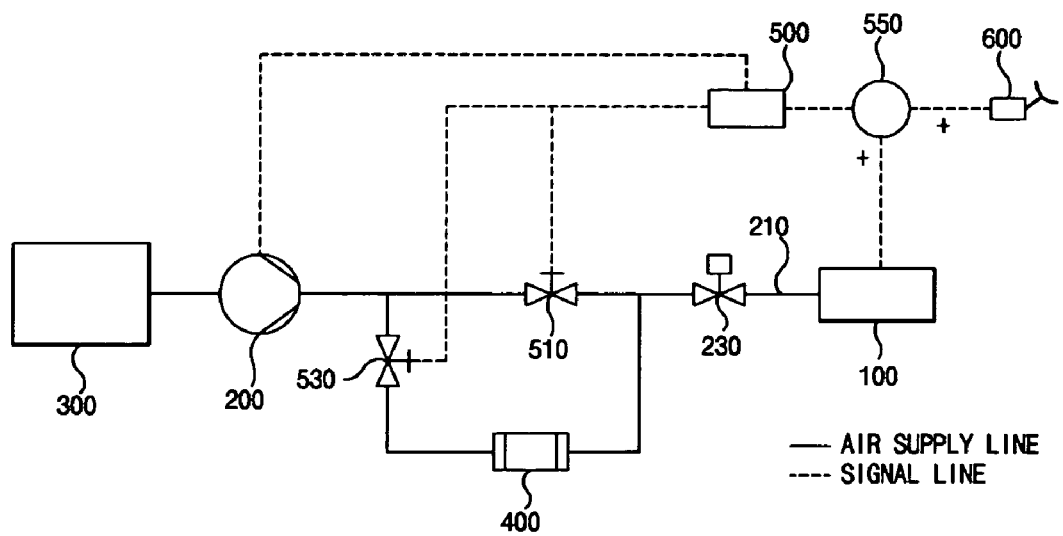
— AIR SUPPLY LINE
---- SIGNAL LINE
[FIG. 3]
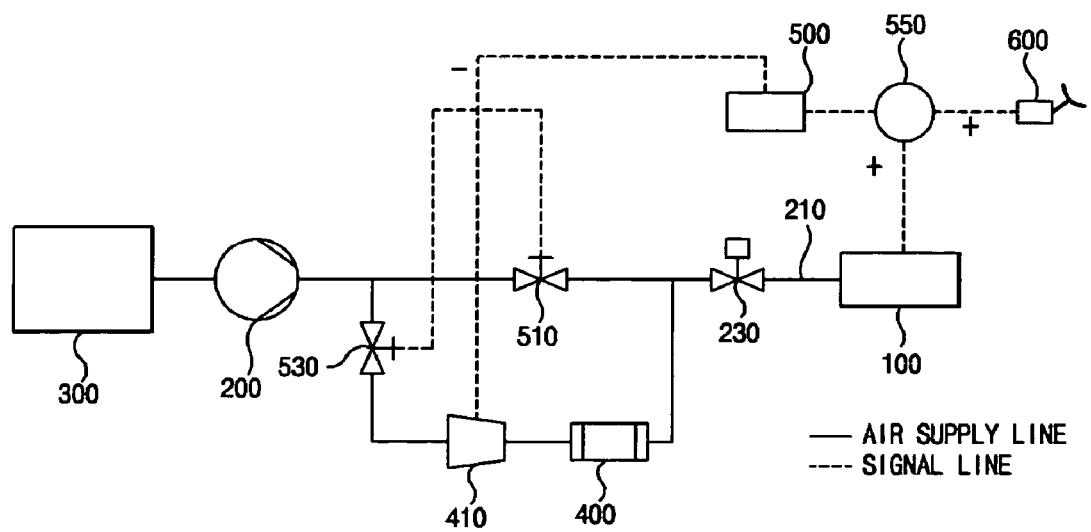
— AIR SUPPLY LINE
---- SIGNAL LINE

FUEL CELL SYSTEM

RELATED APPLICATIONS

The present disclosure relates to subject matter contained in priority Korean Application No. 10-2004-0071362, filed on Sep. 7, 2004, which is herein expressly incorporated by reference in its entirety.

BACKGROUND OF THE INVENTION

1. Field of the Invention

The present invention relates to a fuel cell system.

2. Description of the Related Art

In general, fuel cells are categorized according to the kind of electrolyte that is utilized, such as, AFC, PAFC, MCFC, SOFC, and PEMFC.

Among the fuel cells, PEMFC (Polymer Electrolyte Membrane Fuel Cell) utilizes polymers as its electrolyte. Thus, the PEMFC is not easily corroded by the electrolyte, and the polymer electrolyte, by its nature, does not evaporated. Compared with other fuel cells, the PEMFC features a high current density per unit area, outstanding power output characteristics, low temperature operation, and quick start and response.

Korean Patent Laid-Open No. 2003-0078973 disclosed one example of the PEMFC. Referring to FIG. 1, the PEMFC includes a fuel cell stack unit 110 for simultaneously generating electric energy and heat energy out of the electrochemical reaction between hydrogen and oxygen; a fuel supply unit 120 for supplying a liquid fuel including hydrogen ($H_2$) to an anode 113 of the fuel cell stack unit 110; an air supply unit 130 for supplying air to a cathode 114 of the fuel cell stack unit 110; an air humidifying unit 140 installed at the center of the air supply unit 130 for humidifying the air; a water circulating unit 150 for circulating water that passed through the cathode 114 of the fuel cell stack unit 110 back to the air supply unit 130; an electric energy output unit 160 for supplying an electric energy generated from the fuel cell stack unit 110; and a control unit (not shown) for properly controlling all units 110, 120, 130, 140, 150, and 160. The air supply unit 130 includes an air compressor 131 for pumping air in the atmosphere, and an air supply tube 132 via which the air compressor 131 is connected to the cathode 114 of the fuel cell stack unit 110. At the inlet of the air compressor 131 is an air filter 133 for filtering air that is sucked into.

However, the above-described fuel cell system has the following disadvantages.

Although an adsorptive filter mounted in the system is used to remove possible impurities (dust, NOx, SOx, Organic solvents, etc.) contained in air that is supplied to the fuel cell and thus, to make sure impurity-free air is supplied to the stack, the filter itself is not an fundamental solution for enhancing the performance of the fuel cell, but simply an equipment supplying a clean air without the notion of control.

SUMMARY OF THE INVENTION

It is, therefore, an object of the present invention to provide a fuel cell system, which is capable of preventing a rapid decrease in the oxygen concentration at a cathode of a fuel cell stack especially when a high fuel cell output is required, so that the fuel cell stack can be protected from electrochemical shocks caused by overload, and durability thereof can be much improved. Also, the fuel cell system of the present invention can be an alternative for a secondary cell that is used as an auxiliary power source at a time of overload including acceleration and rapid start of a conventional fuel cell-powered automobile, whereby size of the secondary cell can be reduced or the secondary cell can be deleted as well.

To achieve the above object, there is provided a fuel cell system including: a fuel cell stack generating an electric energy from an electrochemical reaction between hydrogen and oxygen; an air supply pump pumping air to the fuel cell stack; an adsorptive air filter filtering air sucked into the air supply pump; and an oxygen supply device connected to an air supply line between the fuel cell stack and the air supply pump to separate oxygen from the air and then supply the oxygen.

With the aid of the oxygen supply device of the present invention, it becomes possible to increase oxygen load in the air to be supplied to a cathode of the PEMFC of a fuel cell-powered automobile and further, to enhance fundamental performance of the fuel cell.

Preferably, the oxygen supply device is connected in parallel, and the system further comprises a control unit controlling operation of the oxygen supply device.

Here, the control unit receives a displacement of an accelerating pedal, and controls the oxygen supply device to operate when a difference in the displacement of the accelerating pedal per unit of time is greater than a predetermined value.

Therefore, under the control of the control unit, the oxygen supply device runs whenever a high fuel cell output, e.g., acceleration, rapid start and starting the car, is required. In this manner, the fuel cell system is provided with air having a high oxygen concentration and thus, the efficiency thereof is much increased.

In addition, the control unit receives a voltage of the fuel cell stack, and controls the oxygen supply device to operate when a voltage displacement per unit of time is greater than a predetermined value.

According to another embodiment, the control unit receives a voltage of the fuel cell stack, and controls the oxygen supply device to operate when the voltage of the fuel cell stack falls below a reference value.

In consequence, it becomes possible to prevent a rapid decrease in the oxygen concentration at the cathode of the fuel cell stack especially when a high fuel cell output, such as, acceleration, rapid start or starting the car, is required, so that the fuel cell stack can be protected from electrochemical shocks caused by overload, and durability thereof can be improved.

Furthermore, the fuel cell system of the present invention can be an alternative for a secondary cell that is used as an auxiliary power source at a time of overload including acceleration and rapid start of a conventional fuel cell-powered automobile. Thus, it becomes possible to reduce size of the secondary cell or even delete the secondary cell.

Still further, an air compressor can be installed at the inlet of the oxygen supply device for compressing air that is sucked in.

BRIEF DESCRIPTION OF THE DRAWINGS

The above objects, features and advantages of the present invention will become more apparent from the following detailed description when taken in conjunction with the accompanying drawings, in which:

FIG. 1 is a schematic diagram illustrating a prior art fuel cell system;

FIG. 2 is a schematic diagram illustrating a fuel cell system according to one preferred embodiment of the present invention; and FIG. 3 is a schematic diagram illustrating a fuel cell system according to another embodiment of the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIG. 2 is a schematic diagram illustrating a fuel cell system according to one preferred embodiment of the present invention.

As shown in FIG. 2, the fuel cell system of the present invention includes a fuel cell stack 100 for generating an electric energy out of an electrochemical reaction between hydrogen and oxygen; an air supply pump 200 for pumping air to the fuel cell stack 100; an adsorptive air filter 300 for filtering air that is sucked into the inlet of the air supply pump 200; and an oxygen supply device 400 connected to the air supply line between the fuel cell stack 100 and the air supply pump 200.

The fuel cell stack 100 is composed of a plurality of single cells being stacked. Each single cell consists of an anode and a cathode layered on both sides, and there is an electrolyte membrane between the anode and the cathode. More details on the cell structure can be found in the disclosure mentioned in the Description of the Prior Art.

The air supply pump 200 for pumping air to the fuel cell stack 100 is connected to the cathode of the fuel cell stack 100 via the air supply tube 210.

At the outlet of the air supply pump 200 is a flow control valve 230 for controlling flow.

As mentioned before, at the inlet of the air supply pump 200 is the adsorptive air filter 300 for filtering air that is sucked into. Examples of the air filter 300 include molecular sieves, such as, gas separation membrane, zeolite, and activated carbon.

Also, an oxygen supply device 400 is connected to the air supply tube 210 that connects the fuel cell stack 100 and the air supply pump 200.

Preferably, the oxygen supply device 400 is connected in parallel to the air supply tube 210.

Here, the oxygen supply device 400 is a device for separating oxygen from the air and supplying the oxygen to the air supply tube 210.

Pressure for use in the operation of the oxygen supply device 400 can be provided by an air supply use turbo compressor (~5 bar). Details on the constitution and functions of an oxygen supply device are well provided in Korean Utility Model Registration No. 20-0213572. Therefore, the following description will focus mainly on characteristic effects of the present invention.

Even though FIG. 2 and FIG. 3 illustrated only a flow where air with a high oxygen concentration is supplied to the air supply tube 210 through the oxygen supply device 400, it should be noticed that there is also an discharge duct through which residual air with a relatively high nitrogen concentration is discharged.

With the aid of the oxygen supply device 400, it becomes possible to increase oxygen load in the air to be supplied to the cathode of the PEMFC 100 of a fuel cell-powered automobile and further, to enhance fundamental performance of the fuel cell.

As shown in FIG. 2, there are two electrical control valves 510, 530 between the air supply pump 200 and the oxygen supply device 400.

Meanwhile, a control unit 500 can control the operation of the oxygen supply device 400 to make sure that it operates when a high fuel cell output is required.

More specifically, the control unit 500 receives from an input unit 550 that inputs a signal to the control unit 500 regarding a displacement of an accelerating pedal 600. And the control unit 500 controls the electric control valves 510, 530, and the air supply pump 200 to make the oxygen supply device 400 operate when the difference in the displacement of the accelerating pedal 600 per unit of time is greater than a predetermined value $[(dY/dt) \geq c]$.

That is to say, if the difference in the displacement of the accelerating pedal 600 per unit of time is greater than a predetermined value, the control unit 500 closes a first electrical control valve 510, and opens a second electric control valve, whereby the pumped air through the air supply pump 200 can pass through the air supply device 400, and air with a high oxygen concentration can be supplied to the fuel cell stack 100.

Therefore, the oxygen supply device 400 runs whenever a high fuel cell output is required, e.g., when accelerating or starting the car. Since air having a high oxygen concentration is supplied, the efficiency of the fuel cell system is consequently increased.

According to another embodiment of the control unit 500 for controlling the operation of the oxygen supply device 400, the controller 500 controls the electric control valves 510, 530, and the air supply pump 200 to make the oxygen supply device 400 run, if a voltage displacement of the fuel cell stack 100 per unit of time is greater than a predetermined value, $[dV/dt>c']$, or voltage of the fuel cell stack 100 is lower than a reference value, $[V_{total}<V_{min}]$.

Therefore, the fuel cell system of the present invention prevents a rapid decrease in the oxygen concentration at the cathode of the fuel cell stack 100 especially when a high fuel cell output, such as, acceleration, rapid start or starting the car, is required, so that the fuel cell stack 100 can be protected from electrochemical shocks caused by overload, and durability of the fuel cell stack 100 can be improved.

Furthermore, the fuel cell system of the present invention can be an alternative for a secondary cell that is used as an auxiliary power source at a time of overload including acceleration and rapid start of a conventional fuel cell-powered automobile. Thus, it becomes possible to reduce size of the secondary cell or even delete the secondary cell.

Although in this second embodiment the air supply use turbo compressor supplied pressure to the oxygen supply device, it is also possible, as shown in FIG. 3, that an independent air compressor 410 can be installed at the inlet of the oxygen supply device 400.

The air compressor 410 compresses the air sucked into, and provides the necessary pressure to operate the oxygen supply device 400.

The rest of the constitution except for the air compressor 410 is pretty much same with that of the first embodiment, so no further details will be provided here.

The input unit 550 receives the accelerating pedal displacement and voltage of the fuel cell stack 100, and based on an input signal the control unit 500 controls the air compressor 410, and the first and second control valves 510, 530.

In short, the control unit 500 makes the oxygen supply device 400 run whenever a high fuel cell output is required.

So far, it has been assumed that the oxygen supply device 400 was connected in parallel to the air supply tube 210. However, it is also possible to connect the oxygen supply device 400 serially to the air supply tube 210. In so doing, air with a high oxygen concentration can always be supplied to the fuel cell stack 100 regardless of driving conditions of the fuel cell-powered automobile.

In conclusion, the fuel cell system of the present invention has the following advantages.

First, the constitution of the fuel cell system, which includes the fuel cell stack generating an electric energy from the electrochemical reaction between oxygen and hydrogen, the air supply pump pumping air to the fuel cell stack, the adsorptive air filter filtering the air sucked into the air supply pump, and the oxygen supply device connected to the flow line (or the air supply line) between the fuel cell stack and the air supply pump, is capable of increasing the oxygen load in the air that is supplied to the cathode of the PEMFC of the fuel cell-powered automobile, whereby improving the fundamental performance of the fuel cell.

Second, the oxygen supply device is controlled to operate whenever a high fuel cell output, such as, acceleration, rapid start and starting the automobile. In this manner, the fuel cell system is provided with the air having a high oxygen concentration and thus, its efficiency can be enhanced.

Third, the fuel cell system of the present invention prevents a rapid decrease in the oxygen concentration at the cathode of the fuel cell stack especially when a high fuel cell output is required, e.g., when accelerating or rapidly starting the fuel cell-powered automobile, so that the fuel cell stack can be protected from electrochemical shocks caused by overload, and durability of the fuel cell stack can be much improved.

Lastly, the fuel cell system of the present invention can be an alternative for a secondary cell that is used as an auxiliary power source at a time of overload including acceleration and rapid start of a conventional fuel cell-powered automobile. Thus, it becomes possible to reduce size of the secondary cell or even delete the secondary cell.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A fuel cell system comprising:
    a fuel cell stack generating electric energy from an electrochemical reaction between hydrogen and oxygen;
    an air supply pump that pumps air to the fuel cell stack;
    an adsorptive air filter that filters air sucked into the air supply pump;
    an air supply line connected between the air supply pump and the fuel cell stack; and
    an oxygen supply device connected in parallel to the air supply line between the fuel cell stack and the air supply pump, the oxygen supply device configured to separate oxygen from the air and then supply the oxygen to the air supply line.

2. The system according to claim 1, wherein the system further comprises a control unit that controls operation of the oxygen supply device.

3. The system according to claim 2, wherein the control unit receives a displacement of an accelerating pedal, and controls the oxygen supply device to operate when a difference in the displacement of the accelerating pedal per unit of time is greater than a predetermined value.

4. The system according to claim 3, wherein the control unit receives a voltage of the fuel cell stack, and controls the oxygen supply device to operate when a voltage displacement per unit of time is greater than a predetermined value.

5. The system according to claim 3, wherein the control unit receives a voltage of the fuel cell stack, and controls the oxygen supply device to operate when the voltage of the fuel cell stack falls below a reference value.

6. The system according to claim 3, wherein an air compressor is further installed at the inlet of the oxygen supply device to compress air that is sucked in.

7. The system according to claim 2, wherein the control unit receives a voltage of the fuel cell stack, and controls the oxygen supply device to operate when a voltage displacement per unit of time is greater than a predetermined value.

8. The system according to claim 2, wherein the control unit receives a voltage of the fuel cell stack, and controls the oxygen supply device to operate when the voltage of the fuel cell stack falls below a reference value.

9. The system according to claim 2, wherein an air compressor is further installed at the inlet of the oxygen supply device to compress air that is sucked in.

* * * * *